US005436844A

United States Patent [19]

Tokiwa

[11] Patent Number: 5,436,844

[45] Date of Patent: Jul. 25, 1995

[54] PAPER WEB ROUTING CONTROL SYSTEM FOR ROTARY PRESS

[75] Inventor: Shizuro Tokiwa, Zushi, Japan

[73] Assignee: Tokyo Kikai Seisakusho, Ltd., Tokyo, Japan

[21] Appl. No.: 118,964

[22] Filed: Sep. 9, 1993

[30] Foreign Application Priority Data

Sep. 18, 1992 [JP] Japan .................................. 4-249209

[51] Int. Cl.[6] .............................................. G06F 15/46

[52] U.S. Cl. .................................... 364/471; 364/478; 226/109

[58] Field of Search ................................ 364/468–471, 364/478, 403, 131–136, 138; 226/24, 28–30, 108, 109

[56] References Cited

U.S. PATENT DOCUMENTS 4,527,791 7/1985 Piotroski ............................ 364/471
4,803,634 2/1989 Ohno et al. ......................... 364/478
4,839,814 6/1989 Steidel ................................ 364/469
5,050,088 9/1991 Buckler et al. ...................... 364/468
5,309,834 5/1994 Koch .................................. 364/469

*Primary Examiner*—Roy N. Envall, Jr.
*Assistant Examiner*—Thomas E. Brown
*Attorney, Agent, or Firm*—McGlew and Tuttle

[57] ABSTRACT

A paper web routing control system for rotary press having a printing system in which a plurality of printing machine sets are arranged so that paper web routes ranging from a plurality of paper web feeding sections to folding sections via the respective printing sections thereof can be built freely; the paper web routing control system comprises a course portion storage and control means for controlling divided course portions, a paper web route storage and control means having data for constructing continued paper web routes, a link table preparation means for preparing link tables, an input/output control means for generating, transmitting and receiving control signals, and a control section.

6 Claims, 13 Drawing Sheets

FIG. 4

| COURSE No. | SENSOR INPUT | | | MOTOR OUTPUT | | | CONTROL BUTTON | | | OPERATION BRANCH/MERGE POINT | |
|---|---|---|---|---|---|---|---|---|---|---|---|
| | 1 | 2 | 3 | 1 | 2 | 3 | FORWARD FEEDING | BACKWARD FEEDING | STOP | START | END |
| C11 | SE11 | — | — | M11 | M12 | — | ON11 | BK11 | OFF11 | P1 | BR1 |
| C21 | – | — | — | M21 | M22 | — | – | – | – | BR1 | BR5 |
| C31 | SE31 | — | — | M31 | M32 | M33 | ON31 | BK31 | OFF31 | BR5 | F11 |
| C32 | – | — | — | M34 | – | — | – | – | – | BR5 | BR6 |
| C33 | SE32 | — | — | M35 | M36 | — | ON33 | BK33 | OFF33 | BR6 | F12 |
| C12 | SE12 | — | — | M13 | M14 | — | ON12 | BK12 | OFF12 | P2 | BR2 |
| C22 | – | — | — | M23 | – | — | – | – | – | BR2 | BR3 |
| C23 | – | — | — | M24 | – | — | – | – | – | BR3 | BR7 |
| C13 | SE13 | — | — | M15 | M16 | — | ON13 | BK13 | OFF13 | P3 | BR4 |

FIG. 5

| COURSE No. | SENSOR INPUT 1 | SENSOR INPUT 2 | SENSOR INPUT 3 | MOTOR OUTPUT 1 | MOTOR OUTPUT 2 | MOTOR OUTPUT 3 | CONTROL BUTTON FORWARD FEEDING | CONTROL BUTTON BACKWARD FEEDING | CONTROL BUTTON STOP | OPERATION BRANCH/MERGE POINT START | OPERATION BRANCH/MERGE POINT END |
|---|---|---|---|---|---|---|---|---|---|---|---|
| C13 | SE13 | — | — | M15 | M16 | — | ON13 | BK13 | OFF13 | P3 | BR4 |
| C24 | - | — | — | M25 | M26 | M27 | - | - | - | BR4 | BR9 |
| C34 | - | — | — | M37 | - | — | - | - | - | BR7 | BR8 |
| C35 | SE33 | — | — | M38 | - | — | ON35 | BK35 | OFF35 | BR8 | F21 |
| C36 | SE34 | — | — | M39 | - | — | ON36 | BK36 | OFF36 | BR9 | F22 |
| C12 | SE12 | — | — | M13 | M14 | — | ON12 | BK12 | OFF12 | P2 | BR2 |
| C22 | - | — | — | M23 | - | — | - | - | - | BR2 | BR3 |
| C23 | - | — | — | M24 | - | — | - | - | - | BR3 | BR7 |

FIG. 6

| COURSE No. | SENSOR INPUT | | | MOTOR OUTPUT | | | CONTROL BUTTON | | | OPERATION BRANCH/MERGE POINT | |
|---|---|---|---|---|---|---|---|---|---|---|---|
| | 1 | 2 | 3 | 1 | 2 | 3 | FORWARD FEEDING | BACKWARD FEEDING | STOP | START | END |
| C12 | SE12 | — | — | M13 | M14 | — | ON12 | BK12 | OFF12 | P2 | BR2 |
| C22 | – | — | — | M23 | – | — | – | – | – | BR2 | BR3 |
| C23 | – | — | — | M24 | – | — | – | – | – | BR3 | BR7 |
| C13 | SE13 | — | — | M15 | M16 | — | ON13 | BK13 | OFF13 | P3 | BR4 |

FIG. 7

| WEB ROUTING No. | COURSE No. | | | | |
|---|---|---|---|---|---|
| | 1 | 2 | 3 | 4 | 5 |
| 100 | C12 | C22 | C23 | C33 | — |
| 200 | C12 | C22 | C23 | C34 | C35 |

FIG. 8

| COURSE No. | SENSOR INPUT | | | MOTOR OUTPUT | | | CONTROL BUTTON | | | OPERATION BRANCH/MERGE POINT | WEB THREADING MENBER BEING CONTROLLED | START SENSOR | END SENSOR |
|---|---|---|---|---|---|---|---|---|---|---|---|---|---|
| | 1 | 2 | 3 | 1 | 2 | 3 | FORWARD FEEDING | BACKWARD FEEDING | STOP | | | | |
| C12 | SE12 | — | — | M13 | M14 | — | ON12 | BK12 | OFF12 | BR2—OFF | F12 | SE12 | — |
| C22 | - | — | — | M23 | - | — | - | - | - | BR3—OFF | F12 | — | — |
| C23 | - | — | — | M24 | - | — | - | - | - | BR7—ON | F12 | — | — |
| C33 | SE32 | — | — | M35 | M36 | — | ON33 | BK33 | OFF33 | BR6—ON | F12 | — | SE32 |

PAPER WEB ROUTING CONTROL SYSTEM FOR ROTARY PRESS

BACKGROUND OF THE INVENTION AND RELATED ART STATEMENT

This invention relates generally to a paper web routing control system for rotary press, and more particularly to a paper web routing control system for rotary press having a printing system in which a plurality of printing machines sets are arranged, in which portions constituting common paper web courses in a paper web routing section where paper web routes ranging from paper web feeding sections to folding sections can be built freely can be controlled by printing machine sets that use the common paper web routes.

In a rotary press having a printing system comprising a plurality of printing sections, various types of automatic paper web threading mechanism ranging from paper web feeding sections to folding sections via printing sections have so far been proposed, as disclosed in Japan Published Unexamined Patent Application No. Hei-3 (1991)-162353, for example. An outline of the prior-art mechanism and control method will be described in the following.

In the aforementioned automatic paper web threading mechanism, a guide rail constituting a paper web threading guide is installed on each automatic paper web threading route ranging from paper web feeding sections to folding sections via printing sections. The guide rail has two guide members opposing each other and separated vertically; with a gap between the guide members being formed slightly larger than the thickness of a paper web threading belt, which will be described later. The paper web threading belt is mounted so as to be slidably transported between the aforementioned gap.

In the middle of the guide rail provided are pairs of upper and lower driving rollers at appropriate intervals. By driving these driving rollers by drive motors, the paper web threading belt constituting a paper web threading member is transported along the guide rail.

At the tip of the paper web threading belt transported along the guide rail mounted is a paper web feeding section paper web retaining member, called an attachment. Control is effected so that the attachment comes at the leading edge of the guide rail of the paper web feeding section.

As the attachment comes at the leading edge of the guide rail of the paper web feeding section, the operator pastes the tip of the paper roll to the attachment. As the paper web threading belt is then transported toward the folding section, the tip of the paper web is also moved toward the folding section along with the attachment.

In a printing system comprising a plurality of printing sections, complicated combinations of paper web routes ranging from the paper web feeding sections to the folding sections are possible, so a plurality of branch/merge points are provided in the paper web routes. In particular, the branch/merge points on the paper web routes are such that destinations can be selected by manipulating the branch/merge points by means of hydraulic cylinders. Selection of destinations is effected by a control circuit section in accordance with paper web routing patterns.

Furthermore, which of the multiple drive motors disposed on complicated paper web routes is to be driven in which direction is also judged by the control circuit section in accordance with the paper web routing patterns.

Moreover, sensors for confirming the arrival of the attachment are provided at the start point of the guide rail in the paper web feeding section and at the end point of the guide rail in the folding section to stop the drive motor upon arrival of the attachment.

Which of the arrival sensors is to be used to detect the arrival of the attachment is also determined by the control circuit section in accordance with a paper web routing pattern.

Operating buttons for controlling forward feeding, reverse feeding or stopping the paper web threading belt are provided at positions adjacent to each paper web feeding section, folding section and paper web route. By operating the operating buttons, in accordance with a paper web routing pattern, the paper web threading belt being transported is operated continuously operating the paper web threading belt being transported, starting from the start point of the paper web feeding section via paper web route according to the paper web route pattern to the end point of the folding section. That is, different drive motors and sensors being operated are selected and operated for different paper web routing pattern. All this is judged in the control circuit section in accordance with the paper web routing pattern.

As described above, selection of multiple drive motors, sensors, branch/merge points, control buttons, etc. is judged and these input/output signals are controlled in accordance with paper web routing patterns by the control circuit section in a single printing machine set having paper web routes ranging from a plurality of paper web feeding sections via the respective printing sections thereof to the folding sections.

The configuration of printing machines does not necessarily consists of a single set, but generally consists of a plurality of sets. In such a case, each printing machine set has a control unit for a paper web threading device taking charge of each set. There exist common course portions in which one printing machine set shares a paper web route with other sets.

Heretofore, however, these common course portions are controlled exclusively by a specific control unit, making it impossible for other control units to independently control the common course portions. This results in poor workability.

There can be other system configurations in which control circuits for a plurality of printing machine sets are housed in a single control unit so that both the printing machine sets and the common course portions are controlled by the control unit. With this configuration, however, should the control unit fail, all the printing machine sets are become inoperative, increasing the adverse effects of the failure of the control unit. Furthermore, when expanding the configuration of printing machine sets, the control unit has also to be remodelled substantially.

SUMMARY OF THE INVENTION

This invention is intended to solve these drawbacks. It is an object of this invention to provide a paper web routing control system for rotary printing press in which course portions commonly used by a plurality of printing machine sets have such a construction that the printing machine sets using these common course portions can be controlled freely so that workability can be improved and the configuration of printing machine sets can be easily expanded, as necessary.

BRIEF DESCRIPTION OF THE DRAWINGS

FIG. 4 shows an example of the course table for F1 set in FIG. 2.

FIG. 5 shows an example of the course table for F2 set in FIG. 2.

FIG. 6 shows an example of the common course table for F1 and F2 sets in FIG. 2.

FIG. 7 shows an example of the paper web routing table in FIG. 1.

FIG. 8 shows a link table which gives an example of the paper web route for routing paper web to the entry point F12 in FIG. 3.

DETAILED DESCRIPTION OF THE EMBODIMENTS

Figure 1:
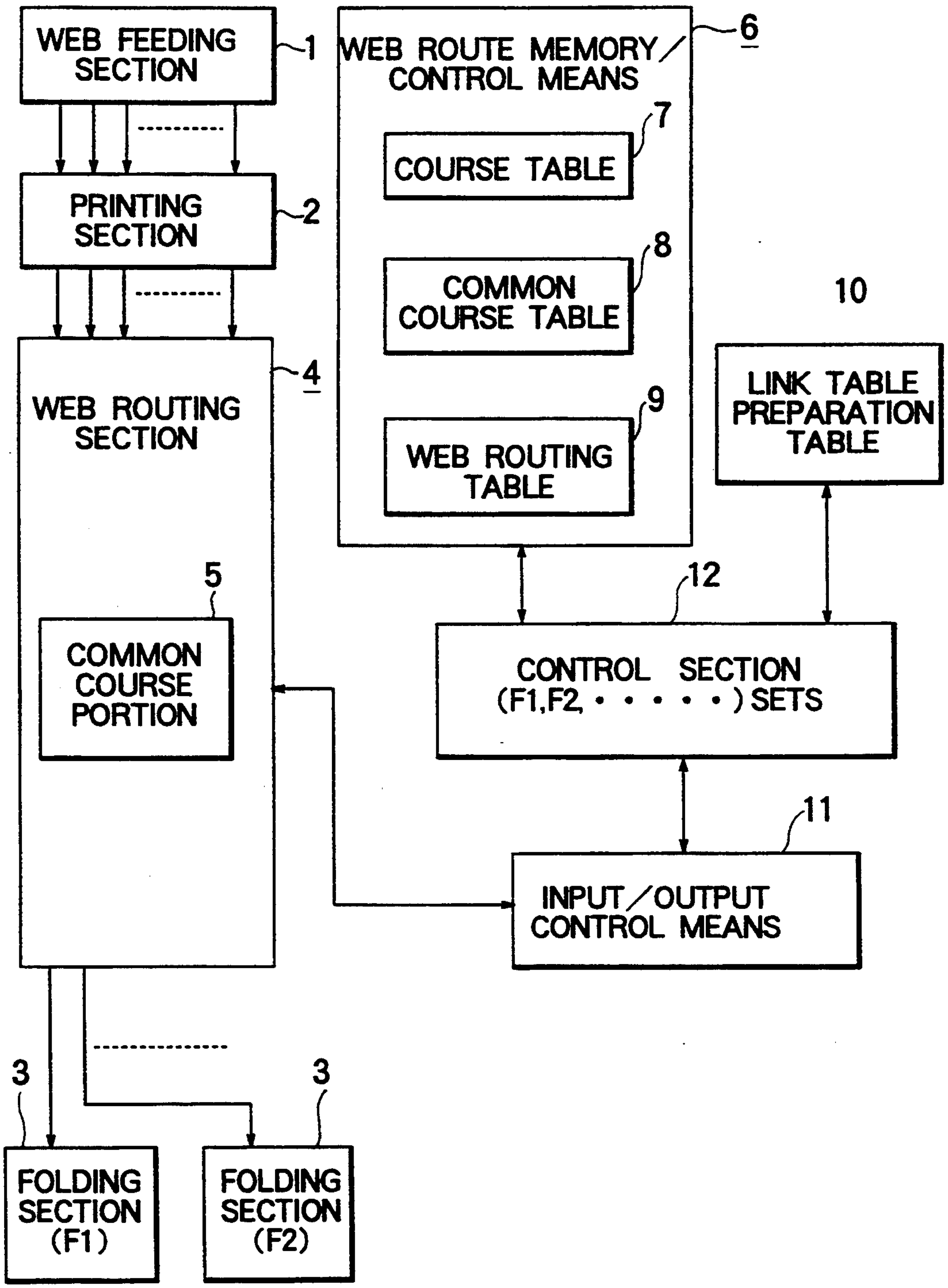
FIG. 1 is a block diagram illustrating the operating principle of an embodiment of this invention.

FIG. 1 is a block diagram illustrating the operating principle of an embodiment of this invention. In FIG. 1, numeral 1 refers to a paper web feeding section provided on each of a plurality of printing sections 2, constructed so that a paper web can be supplied to the printing section 2. Numeral 3 refers to a folding section where the paper web printed in the print-ink section 2 and transported via the paper web routing section 4 is folded and overlapped in a predetermined sequence.

The paper web routing section 4 is divided into a plurality of course portions between the printing section 2 and the folding section 3 so that the route of the paper web from the paper web feeding section 1 to the folding section 3 of each printing section 2 can be freely constructed by appropriately combining these course portions in accordance with the required contents of printed matter being printed. Numeral 5 refers to a common course portion where a paper web route for a printing machine set of the printing section 2, among paper web routes formed by the paper web routing section 4, is common to a paper web route for another printing machine set.

Numeral 6 refers to a paper web route storage/control means for storing and controlling data for constructing c continuous paper web route from the paper web feeding section 1 to the folding section 3; 7 to a course table which stores data necessary for connecting divided course portions of the paper web routing section 4 by each printing machine set; 8 to a common course table which stores data necessary for connecting the input part and the output part of each course portion of the common course portion 5 where a printing machine set shares a paper web route with another printing machine set in the paper web routing section; 9 to a paper web routing table which stores paper web course data for building a continuous paper web route from the paper web feeding section 1 to the folding section 3.

Numeral 10 refers to a link table preparation table for preparing a link table for building a continuous paper web route from the paper web feeding section 1 to the folding section 3 for each printing machine set, using the course table 7 and the common course table 8 based on the paper web course data stored in the paper web routing table 9; 11 to an input/output control means for making the paper web routing section 4 a desired paper web route by generating, transmitting and receiving data and control signals for the input and output sections of each course portion constituting a continuous paper web route from the paper web feeding section 1 to the folding section 3 based on a link table prepared by the link table preparation means 10; 12 to a control section for controlling the paper web routing section 4 via the input/output control means 11 based on a link table prepared by the link table preparation means 10 for each printing machine set.

With the aforementioned configuration, when a given printing machine set uses the common course portion 5 as part of a continuous paper web route from the paper web feeding section 1 to the folding section 3, this printing machine set can independently control the common course portion 5 now in use, without being affected by other printing machine sets.

Figure 2:
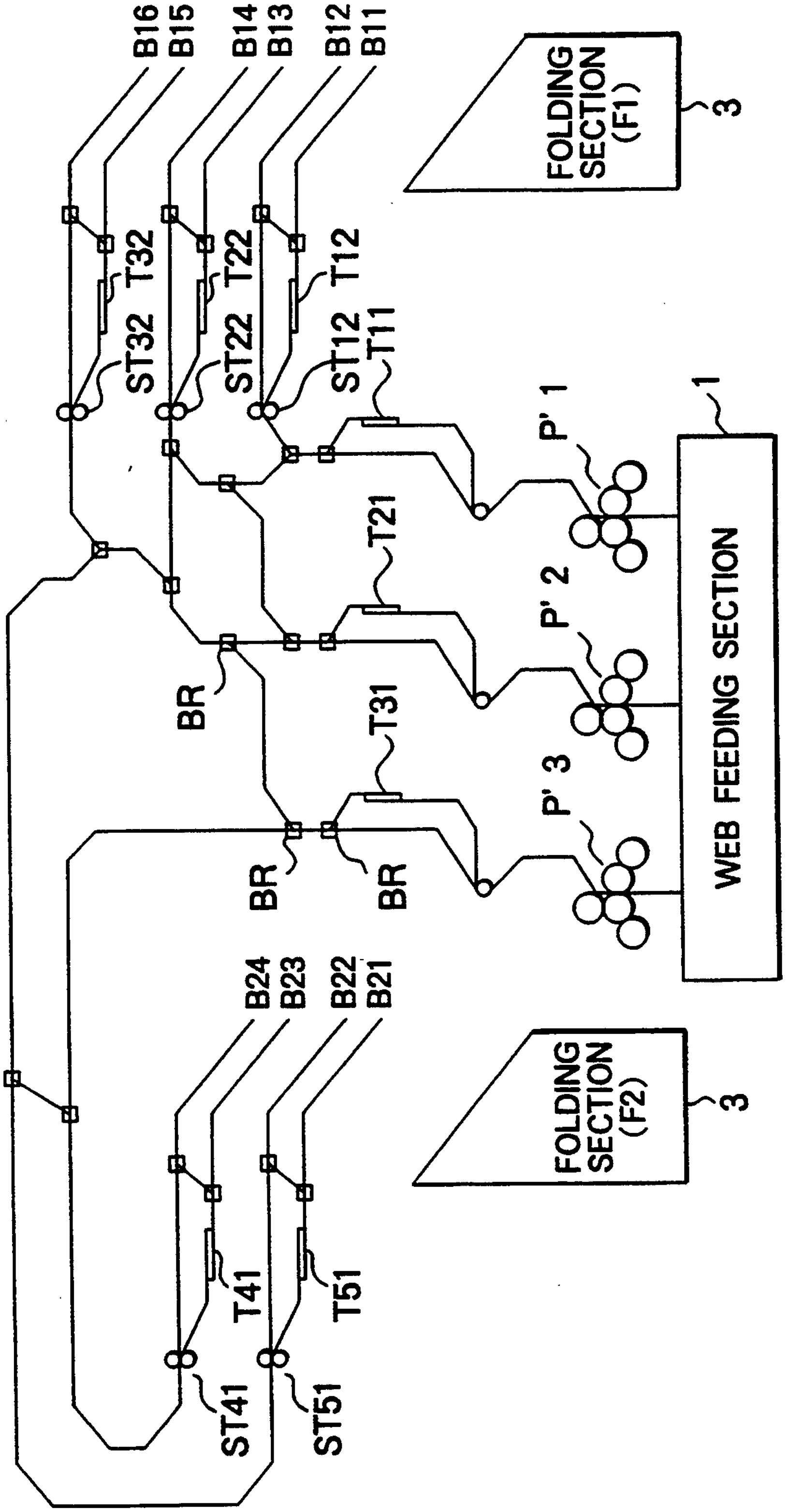
FIG. 2 is a diagram of assistance in explaining an example of the paper web route from the paper web feeding section to the folding section in an embodiment of this invention.

FIG. 2 is a diagram of assistance in explaining an example of a paper web route from the paper web feeding section to the folding section in an embodiment of this invention. Like parts are indicated by like numerals shown in FIG. 1. In FIG. 2, P'1 through P'3 denote printing sections for performing printing on a paper web fed from the paper web feeding section 1. ST12 through ST51 denote slitters for slitting the paper web in longitudinal direction to divide the web in across-the-width direction during a paper web route. T11 through T51 denote turn bars for reversing the paper web. BR denotes a branch/merge point, B11 through B24 denote paper webs.

In FIG. 2, paper webs ascending from the printing sections P'1 through P'3 fed vertically or by turning upside down via the turn bars T11, T21 and T31 as necessary, to the branch/merge points BR. In the paper web routing pattern involving slitting by the slitter ST12, ST22 and ST32, these paper webs are then slit by these slitters. One slit paper web is passed through the turn bars T12, T22 and T32, branched to, or merged into, their respective routes at the branch/merge points BR, and fed to the folding section 3 of F1 as paper webs B11, B13 and B15. The other slit paper web slit by the slitter ST12, ST22 and ST32 is fed to the F1 folding section 3 as paper webs B12, B14 and B16 via the branch/merge points BR without being passed through the turn bars T12, T22 and T32.

The paper webs ascending from the printing sections P'2 and P'3 are slit by the slitters ST41 and ST51 if they are to be routed to paper web routes involving slitting operation. One slit paper web is passed through the turn bars T41 and T51, branched to, or merged into, their respective routes at the branch/merge points BR, and fed to the F2 folding section 3 as paper webs B21 and B23. The other slit paper web is fed to the F2 folding section 3 as paper webs B22 and B24 via the branch-/merge points BR without being passed through the turn bars T41 and T51.

Consequently, there are paper web course portions which are used by paper webs traveling from the printing sections P'2 and P'3 to the F1 and F2 of the two folding sections 3. These portions are hereinafter referred to as common course portions.

Figure 3:
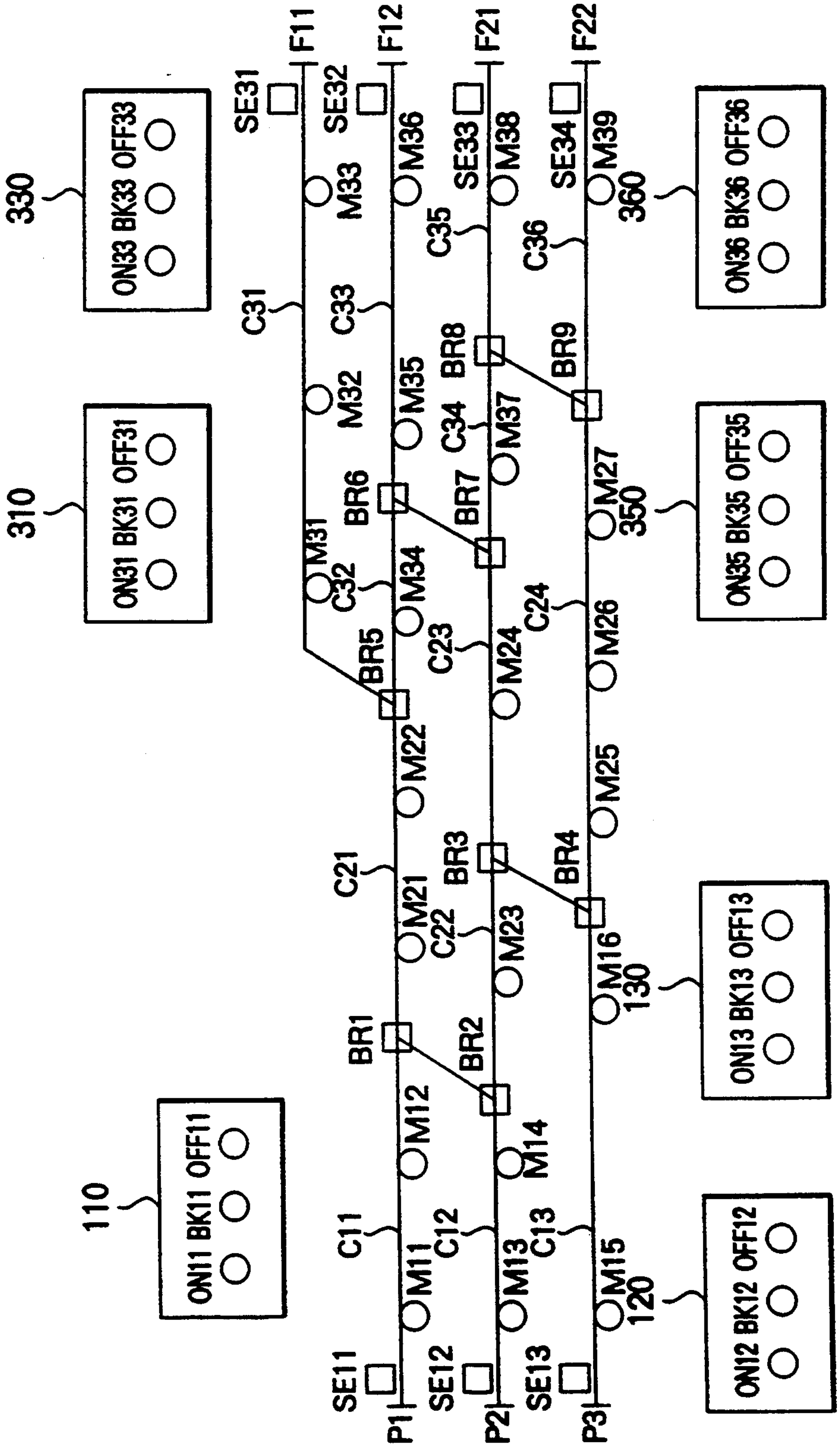
FIG. 3 is a diagram of assistance in explaining in detail the course portions where paper web routes are build in an embodiment of this invention.

FIG. 3 is a diagram of assistance in explaining in detail course portions where paper web routes are to be built in an embodiment of this invention, in which part of the paper web routes shown in FIG. 2 are shown in more detail to facilitate the understanding of this invention. Paper web routes ranging from the paper web feeding section 1 having a plurality of paper web feeding portions to two units of the folding sections 3 (F1 and F2) in FIG. 2 are branched at the branch/merge points BR, for example, into a plurality of course portions.

In FIG. 3, paper web start points at the paper web feeding section 1 are referred to as P1, P2 and P3, and the entry points, that is, the paper web end points of the F1 folding section 3, at the folding section 3 of F1 are referred to as F11 and F12. The entry points, that is, the paper web end points at the folding sections 3 of F2 are referred to as F21 and F22. Thus, the paper web routes ranging from the paper web start points P1, P2 and P3 to the paper web end points F11, F12, F21 and F22 are divided by the branch/merge points BR1 through BR9 into course numbers, or course portions C11, C12, C13, C21, C22, C23, C24, C31, C32, C33, C34, C35 and C36.

The divided course portion C11, for examples has drive motors M11 and M12 and a sensor SE11, starts from the paper web start point, P1, and ends at the branch/merge point BR1, at which the course portion C11 can be connected to another course portion C21, and a branched course branched at the branch/merge point BR2 can be merged into the course portion C11. The paper web threading member passing the course portion C11 is operated by a forward feeding button ON11, backward feeding button BK11 and stop button OFF11 of a control button section 110. The forward feeding button ON11 drives the paper web threading member from the paper web feeding section 1 toward the folding section 3, shown in FIG. 2, and the backward feeding button BK11 drives the paper web threading member from the folding section 3 toward the paper web feeding section 1. The stop button OFF11 stops the paper web threading member.

Next, the course portion C31 will be described. The course portion C31 has drive motors M31, M32 and M33, and a sensor SE31, starts from the branch/merge point BR5 and ends at the paper web end point F11, which is the entry point of the folding section 3 of F1 shown in FIG. 2. The paper web threading member passing the course portion C3t is operated by a forward feeding button ON31, a backward feeding button BK31, and a stop button OFF31 of a control button section 310. Each button performs the same operation as those of the control button section 110 for the course portion C11.

Course portions C12 through C36, which have not been described above, also consist of component elements shown in FIG. 3. The control button sections 110, 120,130, 310,330, 350 and 360 control paper web threading members passing the course portions C11, C12, C13, C31, C33, C35 and C36.

FIG. 4 shows an example of a course table for F1 set in FIG. 2.

The F1 set course table corresponds with the F1 printing machine set, contains data on divided course portions for the F1 printing machine set, and is stored in the memory of the control section for the F1 printing machine set, as will be described later.

Now, the data on the course number C11, that is, the course portion C11, for example, in the figure indicate that the sensor SE11 is disposed on the side of the paper web feeding section, drive motors M11 and M12 are installed in that order from the side of the paper web feeding section, the control buttons ON11, BK11 and OFF11 are provided, and the start point of the course portion C11 is P1 and the end point thereof is BR1.

The data on the course numbers C21 through C13 are also stored in the same manner as the data on the course number C11.

FIG. 5 shows an example of a course table for F2 set in FIG. 2.

The course table for the F2 set corresponds with the F2 printing machine set, contains data on divided course portions for the F2 printing machine set, and is stored in the memory of the control section for the F2 printing machine set, as will be described later.

Description on the course numbers C13 through C23 is the same as that on the course number C11 in FIG. 4.

FIG. 6 :shows an example of a common course table for the F1 and F2 sets in FIG. 2.

In FIG. 3, the course portions used in common by the F1 and F2 sets are the course portions C12, C22, C23 and C13, that is, the course portions that can be used in common by the F1 and F2 printing machine sets. A common course table for the common course portions is stored in a memory that can be accessed by the control section of the F1 and F2 printing machine sets, as will be described later. Description on the data for each course number is the same as in the case of FIG. 4.

FIG. 7 :shows an example of a paper web routing table in FIG. 1. This paper web routing table corresponds with the paper web routing table 9 shown in FIG. 1. The paper web routing table shown in FIG. 7 concerns with only those paper web routes involving the common course portions described above. However, this paperweb routing table also contains the data on individual paper web courses consisting of divided course portions from the paper web feeding section 1 to the folding section 3.

The individual paper web routes from the paper web feeding section 1 to the folding section 3 of F1 have their own paper web routing numbers arranged in the order starting from the side of the paper web feeding section 1 toward the side of the folding section 3, as shown in the figure.

The paper web routing number 100, for example, consists of the common course portions C12, C22 and C23, and the F1 printing machine set course portion C33, respectively, arranged in that order from the side of the paper web feeding section 1. This represents the paper web route from the start point P2 of the paper web feeding section 1 to the entry point F12 of the folding section 3 of F1 in FIG. 3.

In accordance with the paper web routing number 100, a leading address in which information on the course portion C12 is stored, a leading address in which information on the course portion C22 is stored, - - - , a leading address in which information on the course portion C33 is stored are sequentially stored on consecutive addresses on the paper web routing table 9. Thus, the information on the paper web routing number 100 becomes ready for being read collectively.

The paper web routing number 200 consists of common course potions C12, C22 and C23, and F2 printing machine set course portions C34 and C35 arranged in that order starting from the side of the paper web feeding section 1, representing the paper web route from the start point P2 of the paper web feeding section 1 to the entry point F21 of the folding section 3 of F2 in FIG. 3. Information corresponding to the paper web routing number 200 is also stored on the paper web routing table 9, as in the case of the paper web routing number 100.

Data on paper web courses for instructing individual paper web routes are prepared in advance in a format as shown in FIG. 7, not only for paper web routes using the aforementioned common course portions 5 but also for paper web routes not using the common course portions 5, though not shown in FIG. 7.

FIG. 8 shows a link table illustrating an example of paper web routes for routing paper webs to the entry point F12 shown in FIG. 3. The link table is prepared by the link table preparation means 10 shown in FIG. 1, and deals with paper web routes involving the paper web routing number 100 shown in FIG. 7. The link table Dan be obtained by referring to the course table shown in FIG. 4 and the common course table shown in FIG. 6.

That is, sensor inputs, motor outputs, control buttons, the operation of branch/merge points, that is, the operation for selecting branch/merge destinations, and paper web threading members being controlled are entered in the link table in the order of course portion arrangement by referring to FIGS. 4 and 6 for the course numbers C12, C22, C23 and C33 which are data on paper web courses constituting the paper web routing number 100 shown in FIG. 7.

When entering branch/merge operation in the link table, if there is a change in course (a change in course will be described later), a symbol ON is added, and if there is no change in course, a symbol OFF is added. Furthermore, a symbol given to the entry point of the folding section 3 is added to the paper web threading member being controlled. In the case shown in the figure, the given symbol is F12, so the paper web threading member for paper web routes of the paper web routing number 100 is referred to as F12.

The start sensor input SE12 of the first course number C12 is entered as the start sensor, while the end sensor input SE32 of the last course number C33 is entered as the end sensor. In this way, a link table is prepared for paper web routes of the paper web routing number 100, and another link table can be prepared for another paper web routing number, the paper web routing number 200, for example, by referring to FIGS. 5 and 6.

Figure 9:
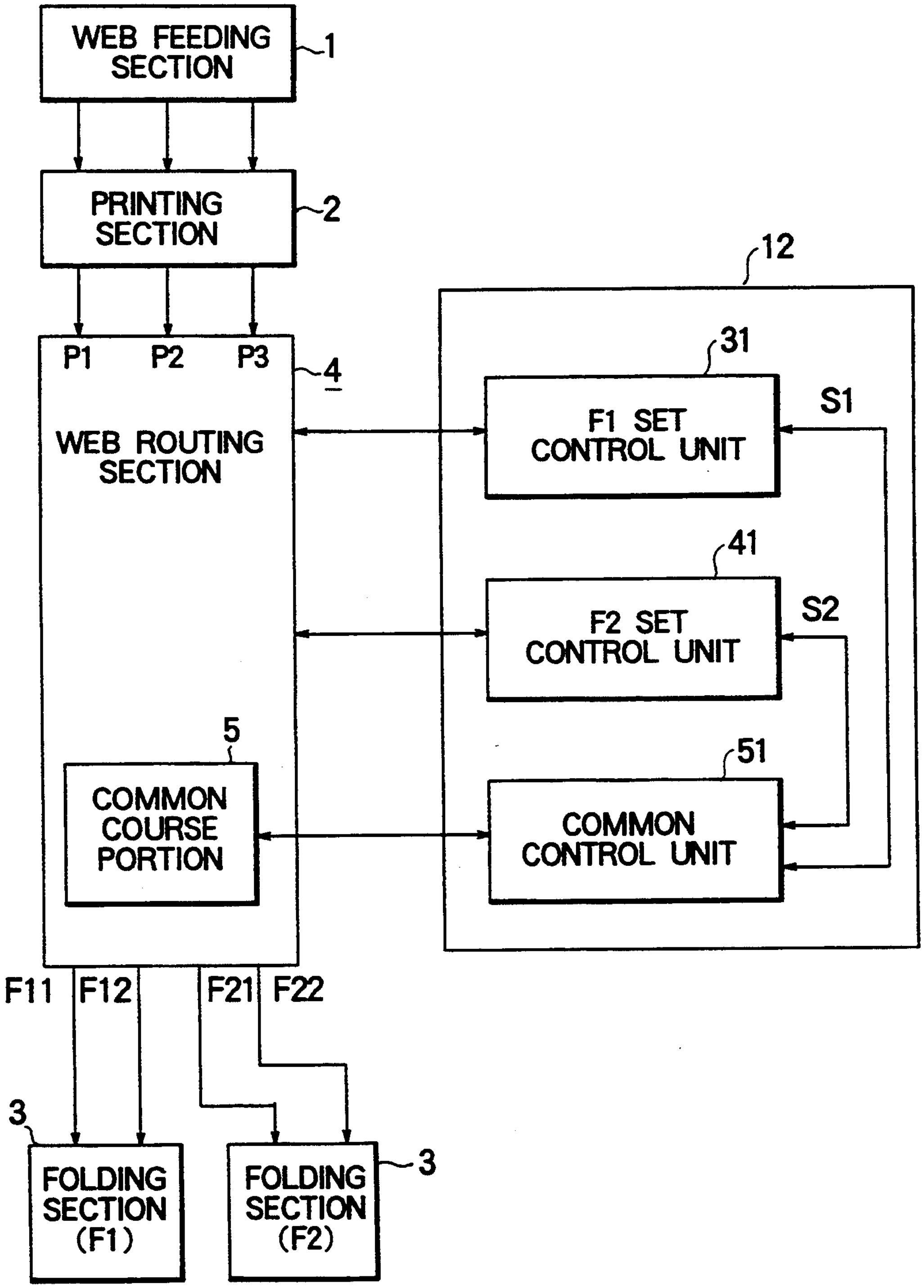
FIG. 9 is a block diagram illustrating an example of the 2-set configuration in an embodiment of this invention.

FIG. 9 is a block diagram illustrating an example of a 2 printing machine set configuration in an embodiment of this invention.

In FIG. 9, numerals 1 through 5 correspond to like parts in FIG. 1, and numeral 31 refers to an F1 set control unit; 41 to an F2 set control unit; 51 to a common control unit, respectively.

The F1 set control unit 31, together with the common control unit 51, which will be described later, constructs and controls the paper web routes for the F1 printing machine set in the paper web routing section 4. The F2 set control unit 41, together with the common control unit 51, constructs and controls the paper web routes for the F2 printing machine set in the paper web routing section 4.

The common control unit 51 transmits and receives data and control signals on the common course portion 5 in the paper web routing section 4 to and from the F1 set control unit 31 and the F2 set control unit 41 to construct and control the paper web routes for the common course portion 5.

Figure 10:
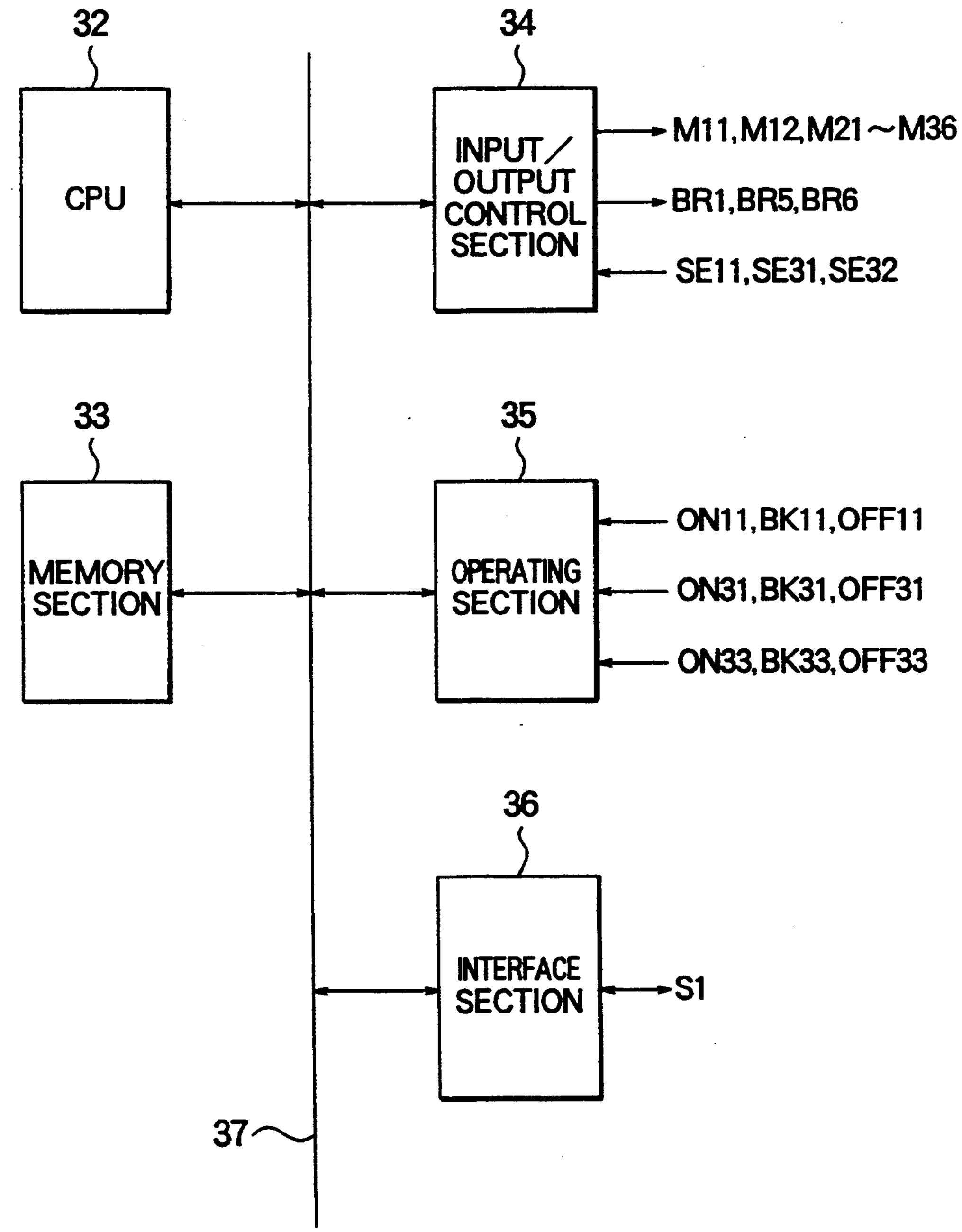
FIG. 10 is a block diagram illustrating the configuration of the F2 set control unit in FIG. 9.

The F1 set control unit 31 has such a construction as shown in FIG. 10.

In FIG. 10, numeral 32 refers to a CPU which is a control section; 33 to a memory section; 34 to an input/output control section; 35 to an operating section; 36 to an interface section; and 37 to a data bus, respectively. M11 through M36, BR1 through BR6, SE11 through SE32, ON11 through OFF11 and ON31 through OFF31 in FIG. 10 correspond with those shown in FIG. 3.

The CPU32 consists of a microcomputer, serving as a central processing unit of the F1 set control unit 31. The CPU 32 can transfer data to a common control unit 51, which will be described later, and transmit and receive control signals to and from the common control unit 51, and execute the processing shown in the flow chart of FIG. 12. The CPU 32 is connected to the memory section 33, etc. via the data bus 37.

The memory section 33 stores programs being processed and controlled by the CPU 32, and stores and controls the course table in FIG. 4, the paper web routing table in FIG. 7, the link table in FIG. 8, etc.

The input/output control section 34 controls the drive motors M11, M12 and M21 through M36 based on instructions from the CPU 32, selectively operates the branch/merge points BR1, BR5 and BR6, and sends detection signals from the sensors SE11, SE31 and SE32 disposed on the paper web routes to the CPU32, together with the detection sensor codes thereof.

The operating section 35 sends the operation signals to the CPU32 based on the switching operations of the operating buttons ON11 through OFF33 of the operating button sections 110, 310 and 330 shown in FIG. 3. The operating buttons ON11 through OFF33 of the operating button sections 110, 310 and 330 can be operated by remote control, and the paper web routing numbers of the paper web routes can be freely set directly or by remote control in the operating section 35.

The interface section 36 transmits and receives common course signals S1 and S2 to and from the outside, particularly the common interface section of the common control unit 51 (refer to FIG. 11), which will be described in the following.

Figure 11:
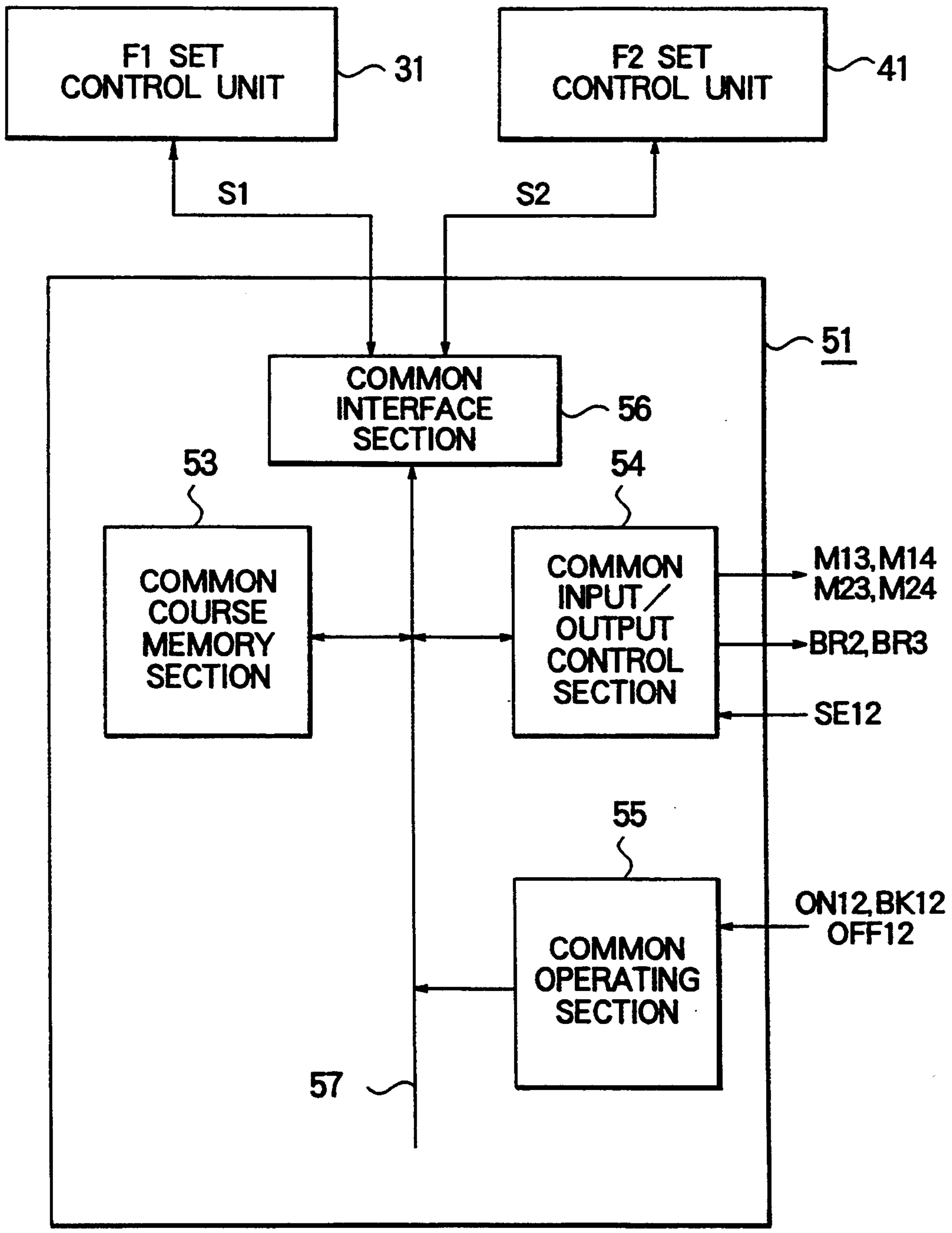
FIG. 11 is a block diagram illustrating the configuration of the common control unit shown in FIG. 9.

FIG. 11 shows the construction of the common control unit in FIG. 9.

In FIG. 11, reference numerals 31, 41 and 51 correspond with the like part in FIG. 9. Numeral 53 refers to a common course storage section; 54 to a common input/output control section; 55 to a common operating section; 56 to a common interface section; and 57 to a data bus, respectively.

The F2 set control unit 41 has the same construction as that of the F1 set control unit 31, which has been described earlier. These F1 set and F2 set control units 31 and 41 can access to the common control unit 51; and can control the common course portion 5 of the paper web routing section 4, shown in FIG. 9 via the common control unit 51.

The common course storage section 53 stores in advance the common course table shown in FIG. 6. The common input/output control section 54 controls the drive motors M13, M14, M23 and M24 based on the instructions from the CPU of the F1 set control unit 31 or the F2 set control unit 41 in accordance with the common course signals S1 and S2, selectively operates the branch/merge points BR2 and BR3, and transmits the detection signals from the sensor SE12 disposed on the paper web routes to the F1 set control unit 31 or the F2 set control unit 41, together with the detection sensor codes thereof. The common operating section 55 transmits operating signals to the F1 set control unit 31 or the F2 set control unit 41 based on the switching operations of the operating buttons ON12, BK12 and OFF12 of the operating button section 120 shown in FIG. 3. The operating buttons ON12, BK12 and OFF12 of the operating button section 120 can be operated by remote control.

The common interface section 56 transmits and receives common signals S1 and S2, such as data and control signals, from the F1 set control unit 31 or the F2 set control unit 41 to the common control unit 51, or from the common control unit 51 to the F1 set control unit 31 or the F2 set control unit 41 in serial or parallel transmission mode.

Typical operations of the paper Web routing control system of a 2-set construction according to this invention, shown in FIG. 9 through 11 will be described, referring to the flow chart shown in FIG. 12.

Figure 12:
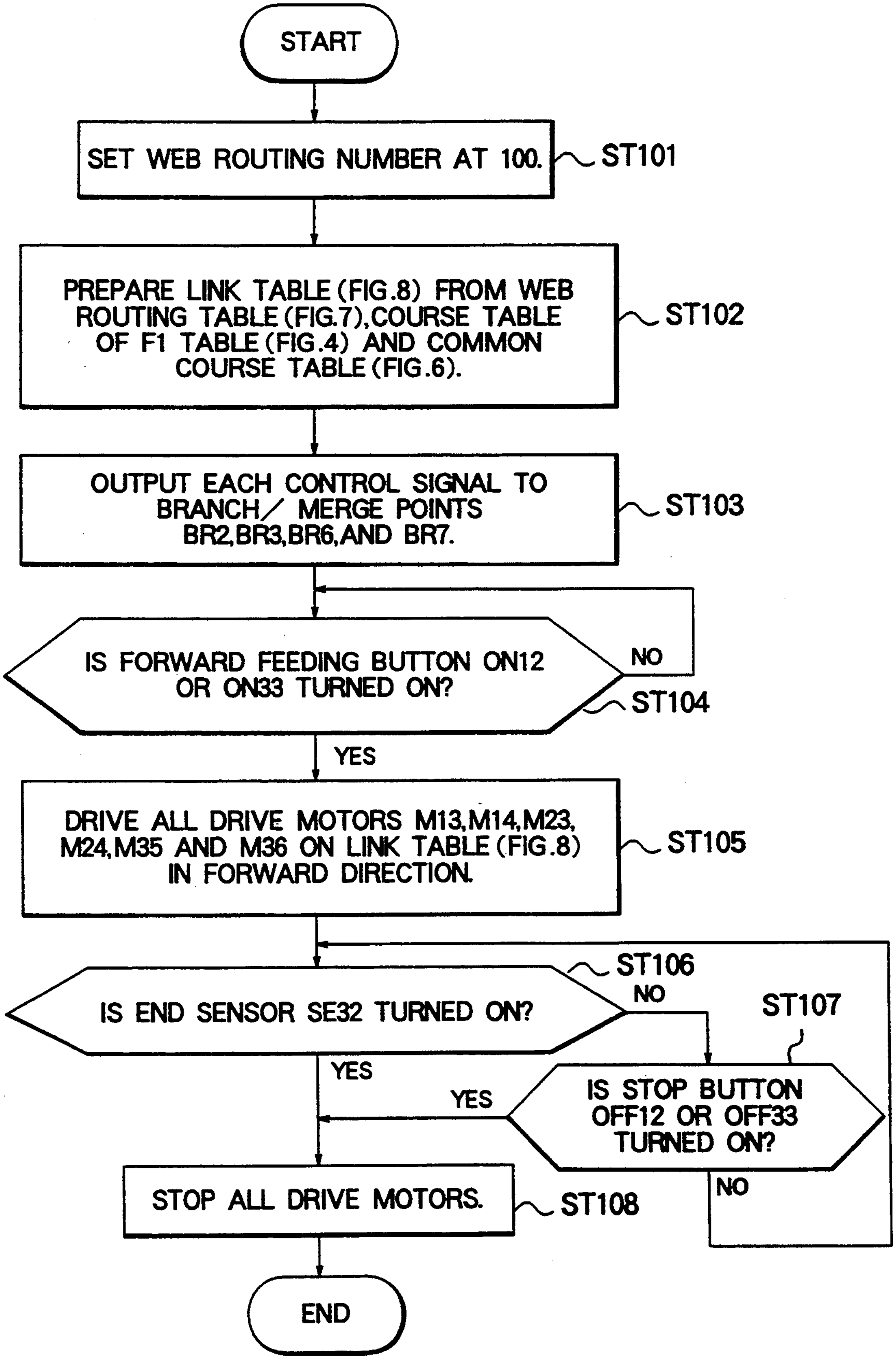
FIG. 12 is a flow chart illustrating an example of operation for transporting the paper web threading member F12 shown in FIG. 9 in the forward direction via the route of the web routing number 100 shown in FIG. 7.

FIG. 12 shows the flow chart of processing procedures for transferring the paper web threading member F12 in the forward direction on the route having the paper web routing number 100.

In the memory section 33 of the F1 set control unit 31 shown in FIG. 10 stored in advance are the course table and the paper web routing table for the F1 set in FIG. 7. In the F2 set control unit 41 stored in advance the course table and the paper web routing table for the F2 set in FIGS. 5 and 7. In the common course storage section 53 of the common control unit 51 stored in advance the common course table in FIG. 6.

In such a state, when the paper web routing number 100 is set by a direct input operation via the operating section 35 of the F1 set control unit 31, for example, or from another unit using transmission lines (not shown) (Step ST101), the CPU32 of the F1 set control unit 31 accesses the column of the paper web routing number 100 stored in the memory section 33, and reads the respective course numbers C12, C22, C23 and C33 for the paper web routing number 100.

The CPU32 judges the data as that for a paper web routes from the last course number 33 to the folding section 3 of F1, and accesses the memory section 33 of the F1 set control unit 31 to obtain data on the course number C33 from the course table of the F1 set shown in FIG. 4. Since the other course numbers C12, C22 and C23 do not exist in the F1 set course table, the CPU32 accesses the common course storage section 53 of the common control unit 51 to obtain the course numbers C12, C22 and C23 from the common course storage section 53.

The CPU32 prepares the link table shown in FIG. 8 based on the paper web routing data for the course numbers C12, C22, C23 and C33 of the paper web routing number 100 thus obtained, and stores the link table in the memory section 33 of the F1 set control unit 31 (Step ST102).

Now, the method of preparing the link table shown in FIG. 8 will be described. It is assumed that the sequence of courses from the paper web feeding section 1 to the F1 folding section 3 is in the order of the course numbers C12, C22, C23 and C33 described in the column of the paper web routing number 100 read from tile memory section 33, and that the data are sequentially stored in the memory section 33, together with the respective course numbers. Where there is a change in course, i.e., to branch to a branch course, or to merge from a branch course, an ON is entered into the column of operations at the branch/merge points. Consequently, as the paper web route goes straight to the next course portion C22 at the branch/merge point BR2 of the course portion C12, an OFF, which means the stop of direction change operation, is entered for the course number C12. In the same manner, BR3-OFF, BR7-ON and BR6-ON are entered in the columns of the operations at the branch/merge points for the course numbers C22, C23 and C33.

Next, the CPU32 enters the sensor SE12 entered in the first course number C12 in the link table into the column of the start sensor, and the sensor SE32 entered in the last course number C33 into the column of the end sensor.

The CPU32 then checks the end point of the last course number C33 to know the paper web threading belt leading to the entry point on the side of the folding section, designates the course numbers for the paper web routing number 100, that is, the entire course consisting of the course numbers C12, C22, C23 and C33, as F12 based on the end point F12, and enters F12 in the columns of paper web threading members being controlled.

In this way, the link table shown in FIG. 8 is prepared in the memory section 33 of the F1 set control unit 31.

Then, the CPU32 operates all the drive motors M13 through M36 in the entire course sections C12, C22, C23 and C33 described in the link table shown in FIG. 8 to initiate driving, stopping, revolution speed and other operations at the same timing. The CPU32 also operates the forward feed buttons ON12 and ON33, the reverse feed buttons BK12 and BK33, and the stop buttons OFF12 and OFF33.

The CPU32 outputs ON signals to the branch/merge point BR6, which is controlled by the input/output control section 34, based on the description contained in the columns of operations at the branch/merge points in the link table shown in FIG. 8, and outputs OFF signals to the branch/merge points BR2 and BR3, and an ON signal to the branch/merge point BR7 via the interface section 36 and the common interface section 56; the BR2, BR3 and BR7 being controlled by the common input/output control section 54 of the common control unit 51 (Step ST103).

Under these conditions, when a forward feed button ON12 or ON33 signal is input from the operating section 35 to the CPU32 (Step ST104), the CPU32 transmits signals to the input/output control section 34 and the common input/output control section 54 to cause the drive motors M35 and M36, which are controlled by the input/output control section 34, and the drive motors M13, M14, M23 and M24, which are controlled by the common input/output control section 54 to rotate in the forward direction (Step ST105). By doing so, the paper web threading member F12 is transported on the paper web route having the paper web routing number 100 from the start point P2 of the paper web feeding section 1 to the entry point F12 of the F1 folding section 3.

As the paper web threading member F12 is being transported in the forward direction, the end sensor SE32 detects the end of the paper web threading member F12 (Step ST106), and informs the CPU32 of the arrival of the paper web threading member F12 via the input/output control section 34. Upon receipt of the information, the CPU32 transmits a signal to the common input/output control section 54 via the input/output control section 34, the interface section 36, and the common interface section 56 to cause all the drive motors in operation on the paper web route having the paper web routing number 100 (Step ST1O8).

Thus, if the tip of the paper web is held by the paper web threading member F12, the paper web is routed to the paper web route having the paper web routing number 100.

When the paper web threading member F12 is transported in the forward direction, and so long as the end sensor SE32 has not yet detected the end of the paper web threading member F12 and the operating section 35 has not yet received a signal indicating the turning on of the stop button OFF12 or OFF33 (Steps ST106, ST107), the forward-direction transportation of the paper web threading member F12 is continued. Furthermore, when the paper web threading member F12 is being transported in the forward direction, but the end sensor SE32 has not yet detected the end of the paper web threading member F12 (Step ST106), if the operating section 35 receives a signal indicating the turning on of the stop button OFF12 or OFF33 (Step ST107), an instruction to stop the paper web threading member F12 is given from the operating section 35 to the CPU32. Upon receipt of the instruction, the CPU32 sends a signal to the input/output control section 34 and the common input/output control section 54 to cause all the drive motors in operation on the paper web route having the paper web routing number 100 to stop (Step ST108). With this, the transportation of the paper web threading member F12 is stopped, making it possible to investigate an abnormality, if any.

The paper web threading member F12 can be transported on the paper web route having the paper web routing number 100 in the reverse direction by causing the operating section 35 to receive a signal indicating the turning on of the reverse feed button BK11 or BK33.

With this operation, the paper web threading member F12 can be transported on the paper web route having the paper web routing number 100 in the reverse direction, that is, from the side of the entry point F12 of the F1 folding section 3 toward the start point P2 of the paper web feeding section 1. Consequently, as the paper web threading member F12 arrives at the start point P2 of the paper web feeding section 1, the tip of the paper web can be fitted to the paper web threading member F12, allowing the paper web to be transported on the paper web route having the paper web routing number 100.

As for the paper web route having the other paper web number 200 shown in FIG. 7, the paper web routing control of the paper web threading member F21 can be effected between the start point P2 of the paper web feeding section 1 and the entry point F21 of the F2 folding section 3 in exactly the same manner as in the case of the paper web route having the paper web routing number 100. In this case, the F2 set control unit 41 controls the F2 set of the paper web routing section 4.

In the foregoing, the construction and control of a paper web route using the common course portion 5 has been described. Needless to say, however, the control of paper web routes without using the common course portion 5 can be realized by the F1 and F2 set control units 31 and 41, respectively.

Although the aforementioned embodiment is of a construction in which the common control unit 51 is independently provided, the common control unit 51 may be provided in either of the F1 set control unit 31 or the F2 set control unit 41. Another improved construction is also possible in which the common course storage section 53, the common input/output control section 54 of the common control unit 51 are combined with the memory section, input/output control section, operating section, etc. of either of the F1 or F2 set control-unit 31 or 41. In this case, the common course storage section 53, the common input/output control section 54, etc. as hardware of the common control unit 51 can be omitted.

Furthermore, the interface section of each unit can also be omitted by transmitting and receiving the common course signals S1 and S2 between the F1 or F2 set control unit 31 or 41 and the common control unit 51 via data buses.

Figure 13:
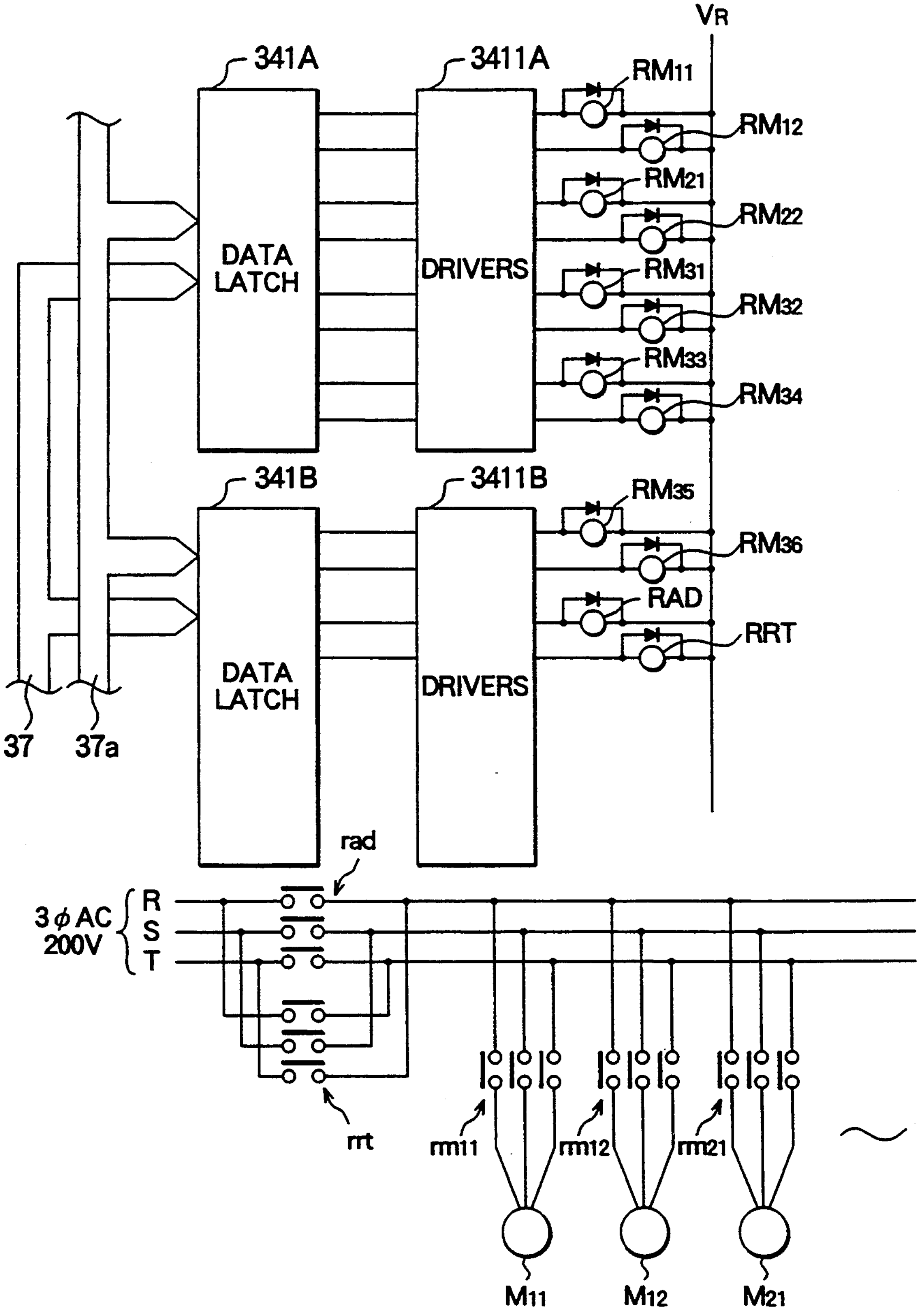
FIG. 13 is a diagram illustrating a control mechanism concerning drive motors M11, M12, M21–M36 controlled by the input/output control section 34 shown in FIG. 10.

FIG. 13 is a diagram illustrating a control mechanism in which the drive motors M11, M12, M21–M36 are controlled by the input/output control section 34 shown in FIG. 10. The lower half of FIG. 13 shows a construction where the drive motors M11, M12, M21, - - - are connected to a 3-phase 200 V AC power source via relay contacts, while the upper half thereof shows the essential part of a portion for controlling drive motors in the input/output control section 34.

In the Figure, reference numerals 341A and 341B refer to data latches;.3411A and 3411B to drivers; RM11, RM12, - - - RM36, RAD and RRT to relays energized by the drivers 3411A and 3411B, rad, rrt, rm11, rm12, rm21, - - - to contacts of the corresponding relays RAD, RRT, RM11, RM12, RM21, - - - ; M11, M12, M21, - - -to drive motors, respectively. Numeral 37 refers to a data bus; 37*a* to an address bus, respectively.

The control mechanism of the drive motors M13, M14, M23, M24 by the input/output control section 54 shown in FIG. 11 has the same construction as that shown in FIG. 13.

Required drive motors M13, M14, - - - , corresponding to the paper web routing number shown in FIG. 7, to the paper web routing number 100, for example, are driven.

In the foregoing, description has been made about FIG. 3 which illustrates this invention in a simplified manner to facilitate understanding. Even if the number of printing machine sets is increased, the paper web routing control from the paper web feeding section 1 to the folding section 3 can be effected and the paper web routes can be formed in exactly the same manner.

As described above, this invention having such a construction that common course portions can be controlled independently of the control units of the other printing machine sets by the respective control units controlling printing machine sets makes it possible to improve the paper web routing efficiency in a printing system.

Even if a control unit fails, the failure is limited to the printing machine set controlled by that control unit, preventing the failure from affecting the other printing machine sets.

Furthermore, a failure of a common control unit result only to the failure of the common course portions, keeping other course portions operating normally without affecting the other equipment.

Moreover, printing machine sets can be expanded without the need for remodelling the existing control units, merely by adding necessary control units or common control units. Thus, this invention makes it possible to easily expand the system and reduce installation costs.

What is claimed is:

1. An automatic paper web routing control system for a printing system comprising:

a plurality of paper web routes having a plurality of paper web feeding sections at one end and a plurality of folding sections at another end;

a plurality of printing sections for printing on paper webs and feeding the printed paper webs to said plurality of paper web feeding sections;

a plurality of slitters positioned in said plurality of paper web routes and for slitting the paper webs;

a plurality of turn bars positioned in said plurality of paper web routes and for reversing the paper webs;

a plurality of branch points positioned in said plurality of paper web routes and for dividing said plurality of paper web routes into course portions and for switching the paper webs between said course portions;

a course portion storage and control means for dividing said paper web routes into a plurality of course portions, and storing and controlling an input portion and an output portion of said divided course portions;

a paper web route storage and control means for combining course portions existing in said course portion storage and control means, and having data for building continuous paper web routes from said paper web feeding section to said folding section;

a link table preparation means for causing said course portion storage and control means and said paper web route storage and control means to generate data for transmitting signals necessary for building said respective paper web routes for said course portions forming continuous paper web routes from said paper web feeding section to said folding section;

an input/output control means for generating, and transmitting and receiving control signals for said input section and said output section of said course portions forming continuous paper web routes from said paper web feeding section to said folding section; and a control section for controlling said various means, so that paper web routes are controlled centrally and said plurality of said course sections are configured freely to form said plurality of paper web routes from one of said printing sections to said plurality of folding sections.

2. A paper web routing control system for a printing system comprising:

a plurality of paper web routes having a plurality of paper web feeding sections at one end and a plurality of folding sections at another end a plurality of printing sections for printing on paper webs and feeding the printed paper webs to said plurality of paper web feeding sections;

a plurality of slitters positioned in said plurality of paper web routes and for slitting the paper webs;

a plurality of turn bars positioned in said plurality of paper web routes and for reversing the paper webs;

a plurality of branch points positioned in said plurality of paper web routes and for dividing said plurality of paper web routes into course portions and for switching the paper webs between said course portions;

a paper web route storage and control means for storing and controlling data for building continuous; paper web routes from paper web feeding sections to folding sections;

a common course table for classifying paper web route portions used commonly by said printing machine set and other printing machine sets among data stored and controlled by said paper web route storage and control means as common course portions, and storing and controlling said classified common course portions;

a link table preparation means for preparing a link table for building continuous paper web routes from said paper web feeding sections to said folding sections by combining said common course portions with other paper web routing course portions;

a control section for independently connecting and controlling printing machine sets from said paper web feeding sections to said folding sections based on said link table prepared by said link table preparation means, said control section freely configuring said course sections to form said plurality of paper web routes from one of said printing sections to said plurality of folding sections;

an input/output control means for generating, transmitting and receiving for each printing machine set data and control signals necessary for building continuous paper web routes from said paper web feeding sections to said folding sections in accordance with instructions given by said control section that independently controls each printing machine set, so that printing machine sets using said common course portions can keep said common course portions under the own control thereof.

3. A paper web routing control system for rotary press as set forth in claim 2 wherein said common course table stores for each common course portion data on drive motors, sensors, branch/merge points, operating button input section and output section, which are kept under the own control thereof.

4. A paper web routing control system for rotary press as set forth in claim 2 wherein said link table preparation means, in preparing a link table, rearrange said common course portions and other paper web routing course portions in such an order that said common course portions and said other paper web routing course portions are connected from said paper web feeding sections toward said folding sections, and stores the data thereof.

5. A paper web routing control system for rotary press as set forth in claim 2 wherein said input/output control means has means for connecting at least more than one of said drive motors, sensors, operating buttons to signals from input and output sections of course portions forming continuous paper web routes from said paper web feeding sections and said folding sections in a link table prepared by said link table preparation means.

6. An automatic paper web routing control system for a printing system, the control system comprising:

course portion table means for storing a plurality of course control data parcels, each of said plurality of course control data parcels representing one a plurality of course portions;

route table means for combining individual said course control parcels into a plurality of routes extending from a plurality of printing machines to a plurality of folding machines, said route means storing said combined individual course control parcels as route parcels;

link table means for reading said route table means and selecting one of said route parcels, said link table means generating control signals from said selected one of said route parcels;

input/output means for transmitting said control signals from said link table means to the course portions and for receiving control signals from the course portions; and control means for controlling said course portion table means, said route table means, said link table means and said input/output means to freely configure said course portions to guide a paper web along one of said plurality of routes from one of said printing machines to one of said plurality of folding machines.

* * * * *